(12) United States Patent
Grosz

(10) Patent No.: US 10,343,656 B2
(45) Date of Patent: Jul. 9, 2019

(54) TRAILER JACK BLOCK AND STOP

(71) Applicant: William R. Grosz, Troy, OH (US)

(72) Inventor: William R. Grosz, Troy, OH (US)

( * ) Notice: Subject to any disclaimer, the term of this patent is extended or adjusted under 35 U.S.C. 154(b) by 0 days.

(21) Appl. No.: 15/373,765

(22) Filed: Dec. 9, 2016

(65) Prior Publication Data

US 2018/0162329 A1    Jun. 14, 2018

(51) Int. Cl.
*B60T 3/00* (2006.01)
*B60S 9/18* (2006.01)

(52) U.S. Cl.
CPC .. *B60T 3/00* (2013.01); *B60S 9/18* (2013.01)

(58) Field of Classification Search
CPC ...... B60S 9/14; B60S 9/16; B60S 9/18; B60T 3/00
See application file for complete search history.

(56) References Cited

U.S. PATENT DOCUMENTS

| | | | |
|---|---|---|---|
| 2,196,715 A | 4/1939 | Wiedman | |
| 2,771,200 A | 4/1954 | Gilliard | |
| 2,931,463 A * | 4/1960 | Stansbury | B60D 1/66 188/32 |
| 3,029,886 A | 4/1962 | Hansen | |
| 3,365,159 A | 7/1966 | Corneliusen | |
| D230,836 S | 3/1974 | Powers | |
| 3,920,212 A | 11/1975 | Westwood | |
| 5,332,066 A * | 7/1994 | Pickeral | B60P 3/10 188/32 |
| 5,799,961 A * | 9/1998 | Schmeets | E06C 5/00 182/92 |
| D440,022 S | 4/2001 | Simpson | |
| 6,345,474 B1 | 2/2002 | Triplett | |
| 6,874,745 B1 * | 4/2005 | Bean | B60S 9/02 248/346.01 |
| 7,000,740 B2 * | 2/2006 | Chrisco | B60T 3/00 188/32 |
| 7,802,709 B1 * | 9/2010 | Lewis | B60R 9/00 224/401 |
| 7,980,532 B2 * | 7/2011 | Wickwire | B66F 7/243 254/88 |
| 8,534,631 B2 | 9/2013 | Shirley | |
| 2005/0017223 A1 | 1/2005 | Lucas | |
| 2006/0071139 A1 | 4/2006 | Lemirande | |
| 2012/0090925 A1 * | 4/2012 | White | B60P 3/36 188/32 |
| 2013/0181105 A1 * | 7/2013 | Shirey | B60S 9/02 248/346.03 |
| 2015/0028177 A1 * | 1/2015 | Vargas | B60S 9/02 248/542 |

* cited by examiner

*Primary Examiner* — Nicholas J Lane
(74) *Attorney, Agent, or Firm* — R. William Graham

(57) ABSTRACT

A jack block and stop for a trailer includes an internal relatively lightweight support structure, a bottom surface having a relatively flat aspect to provide stable support when weight is applied on said jack block and stop, an upper surface having relatively flat aspect and a central open surface entirely extending through from said upper surface to said bottom surface which is large enough to at least part of a trailer part to retain said jack block thereabout in a stored mode.

6 Claims, 8 Drawing Sheets

TRAILER JACK BLOCK AND STOP

FIELD OF THE INVENTION

The present invention relates to a device for stabilizing a trailer jack on hard or soft ground after the trailer has been disconnected from its towing vehicle, and more particularly to a trailer jack block and stop that can deployed from a stored position on a trailer jack onto a surface to receive a wheel, a jack pad or the shaft of a jack and serve as a wheel stop. The present invention provides a block of substantially height to reduce the crank travel of the jack support when parking a trailer and includes a coating to provide easy cleanup.

BACKGROUND OF INVENTION

Mobile trailers, whether boat, recreational vehicle or other trailer are commonly blocked and supported when fixed at a location. The most common technique for doing so includes use of one or more blocks stacked up on top of each other. Concrete blocks simple to deploy but are heavy and not user friendly from a storage standpoint. To support certain objects, there might be multiple blocks used. Stacking such block can provide an unstable condition.

To overcome these issues, there have been numerous jack stands and blocks which are made of metal, plastic, wood, etc. with various structural designs. While traditional blocks were used as they provide good strength, drawbacks of weight and bulk were addressed. Recent alternative frame or plastic type stand designs suffer from durability and structural issues. The stand/block designs vary in expensive.

Additionally, many instances of the ground surface can be quite messy (e.g., muddy) and thus the stands/blocks are likely to pick up debris (mud). This presents storage issues or requires cleaning prior to storage.

Therefore, there is a need in the art for a structure support stand that addresses the above-stated problems in the art. Such a device must be capable of supporting various objects. Such a device must be relatively lightweight and easy to transport, assemble and use. Preferably, the device will be relatively inexpensive to manufacture and maintain.

SUMARY OF INVENTION

An object of the present invention is to provide a new and improved jack block and stop for trailers which is relatively lightweight, ergonomically designed, durable, easy to clean and simple in its assembly and or construction.

Another object of the invention is to provide a new and improved jack block and stop which can be easily stacked and provide a stable support surface in single or stacked relation for supporting a trailer load.

Still another object of the supporting is to provide a new and improved jack block and stop which is relatively simple and inexpensive.

A further object is to provide a jack block and stop which is easy to manufacture and is build.

Yet another object is to provide a jack block and stop which is readily storable on top of a trailer jack in a relatively compact space and which when so disposed travel thereof is confined by the trailer jack.

Accordingly, the invention is directed to a jack block and stop for a trailer of the type having an integral jack at a forefront of the trailer, the jack having an upper stem and crank handle extending above the trailer and a lower end having an axially extendable foot below the trailer. The jack block and stop includes an internal relatively lightweight support structure, a bottom surface having a relatively flat aspect to provide stable support when weight is applied on the jack block and stop, an upper surface having relatively flat aspect, and a central open surface entirely extending therethrough from the upper surface to the bottom surface which is large enough to receive the crank therethrough and at least part of the stem to retain the jack block and stop thereabout in a stored mode, for example, less than about 3 inches in diameter. The central open surface is preferably smaller than the foot to prevent the same from passing entirely therethrough. Thus, in the case where the foot includes a wheel, the central open surface can receive part of the wheel therein which serves to fix its position against movement. The jack block and stop can also include rubberized coating encasing surfaces thereof and provide an anti-slip surface as well as an easy to clean surface.

The internal structure can span the upper and bottom surfaces from, e.g., about 1 inch to 6 inches. It is envisioned that in the case where the internal structure span is smaller providing a thinner support structure, the upper and bottom surfaces can include a respective male and female complementary surface aspects to achieve stable way of stacking of like formed jack block and stops. A suitable width for the jack block and stop can preferably be from about 6 to 12 inches, for example.

These and other objects of the invention will be apparent to those skilled in the art when reviewing the instant invention, and the objects contemplated are attained, as hereinafter set forth, and pointed out in the appended claims and illustrated in the accompanying drawings. The accompanying drawings are illustrative only, and that changes may be made in the specific construction illustrated and described herein and within the scope of the appended claims.

Figure 1:
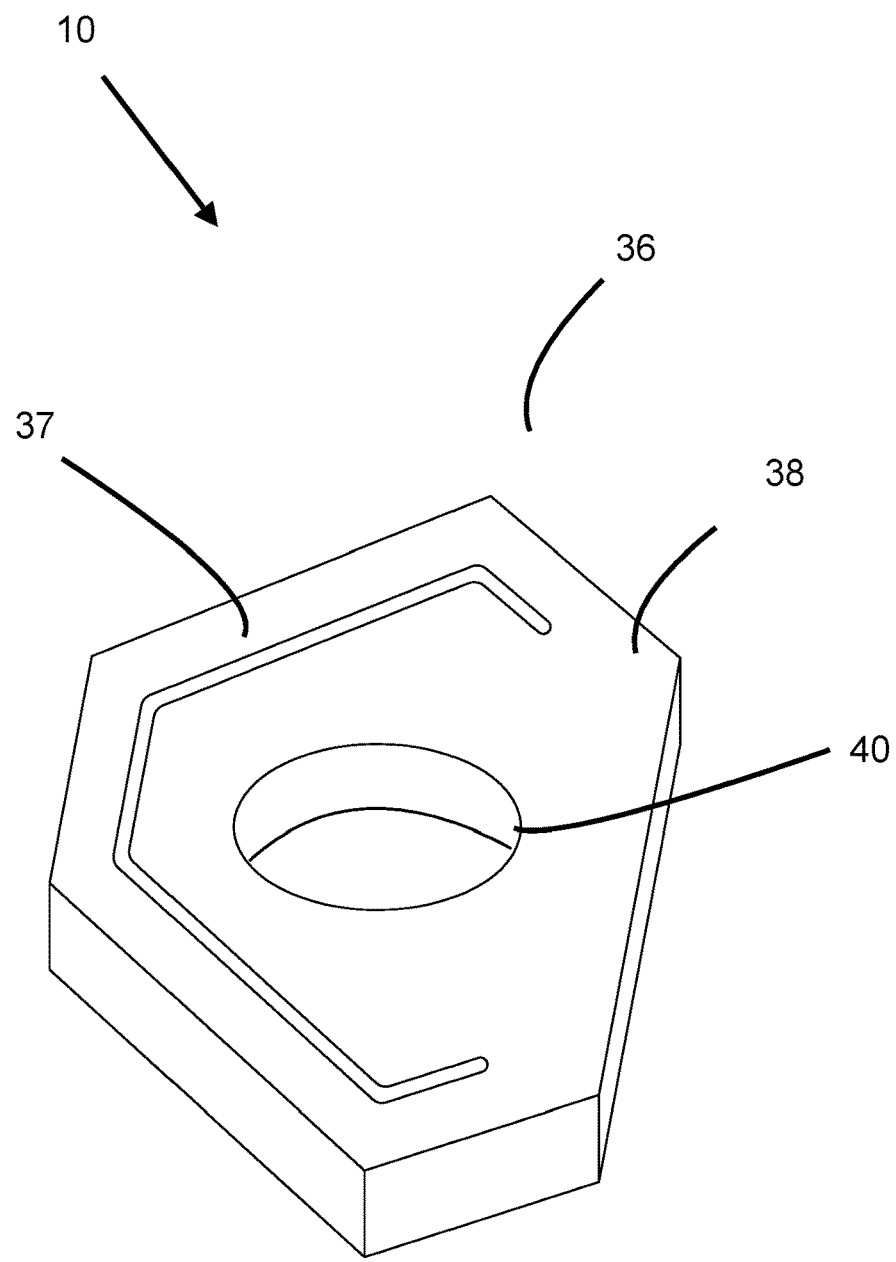
FIG. 1 is a perspective view of the instant invention.
Figure 2:
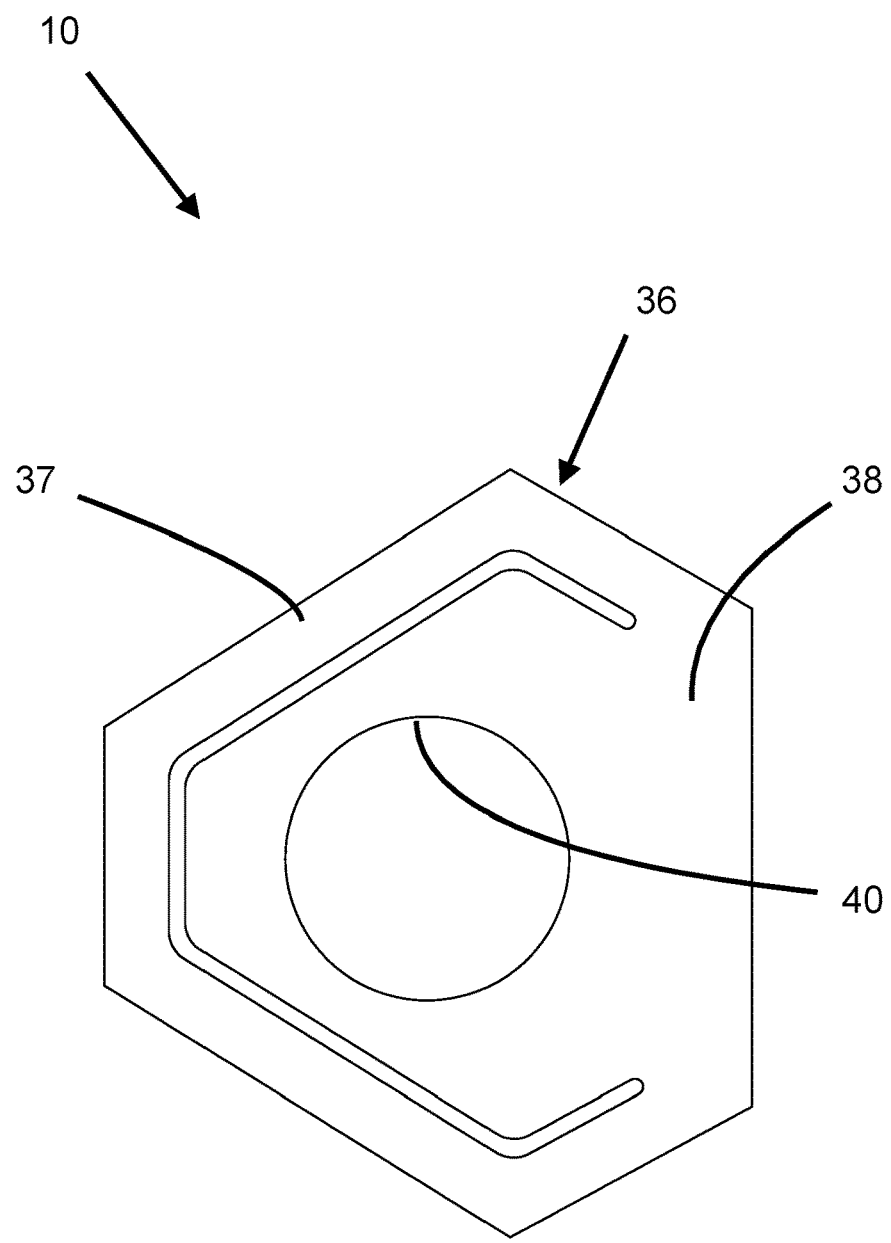
FIG. 2 is a top view of the stand support of the invention.
Figure 3:
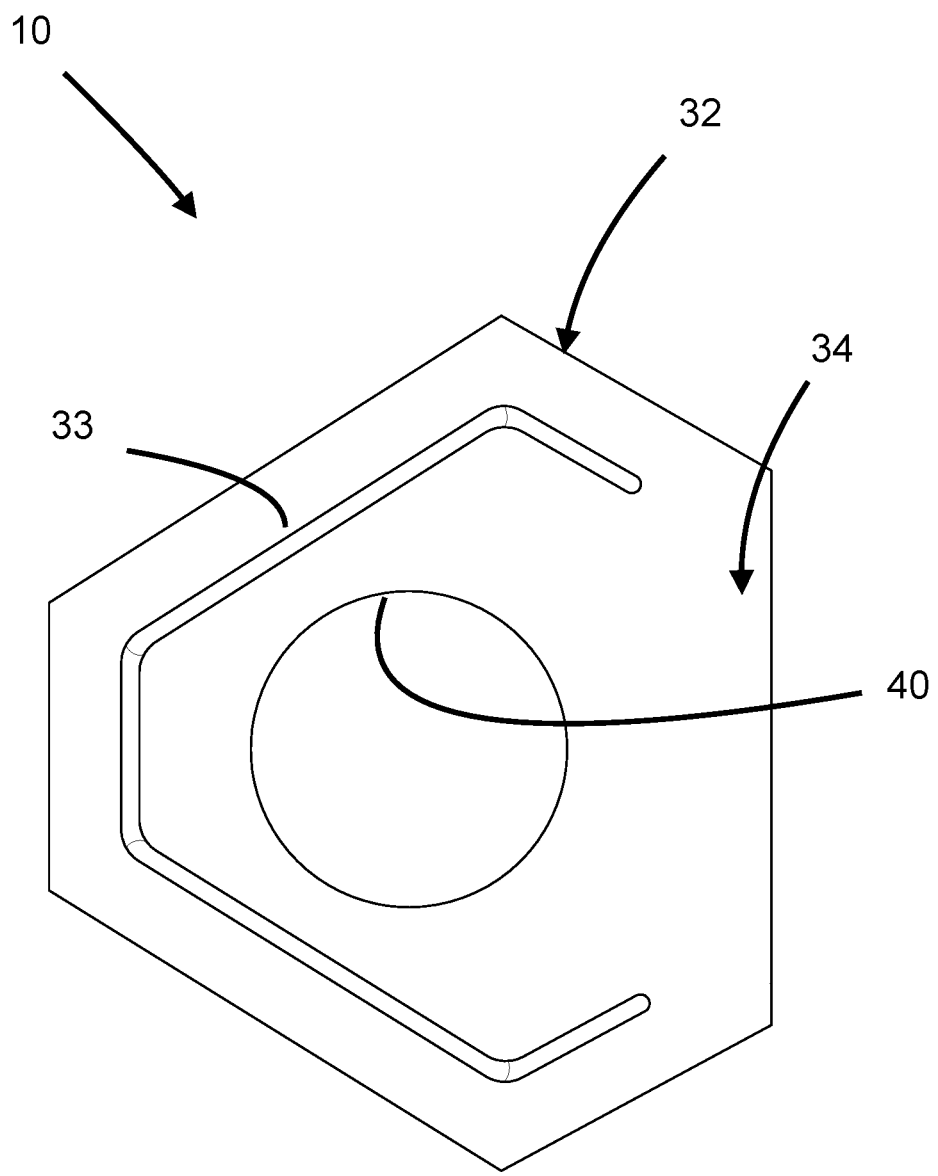
FIG. 3 is a bottom view of the invention.
Figure 4:
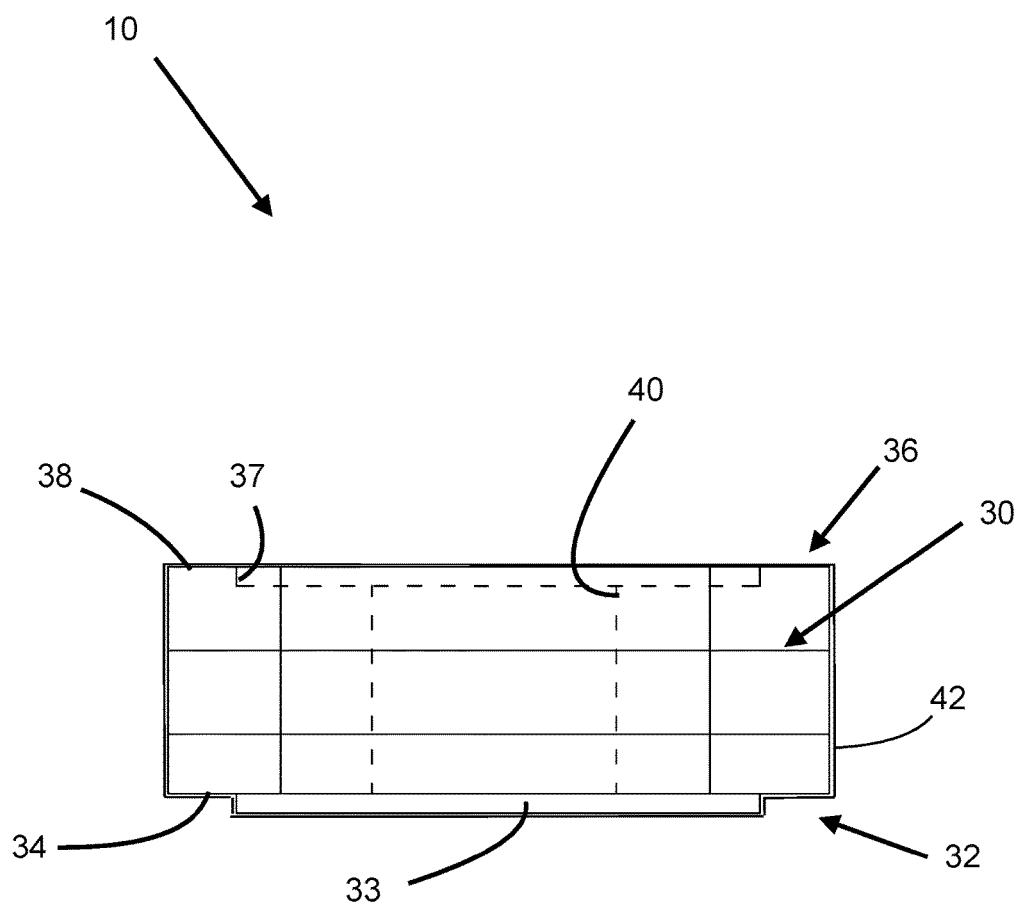
FIG. 4 is side view of the invention.
Figure 5:
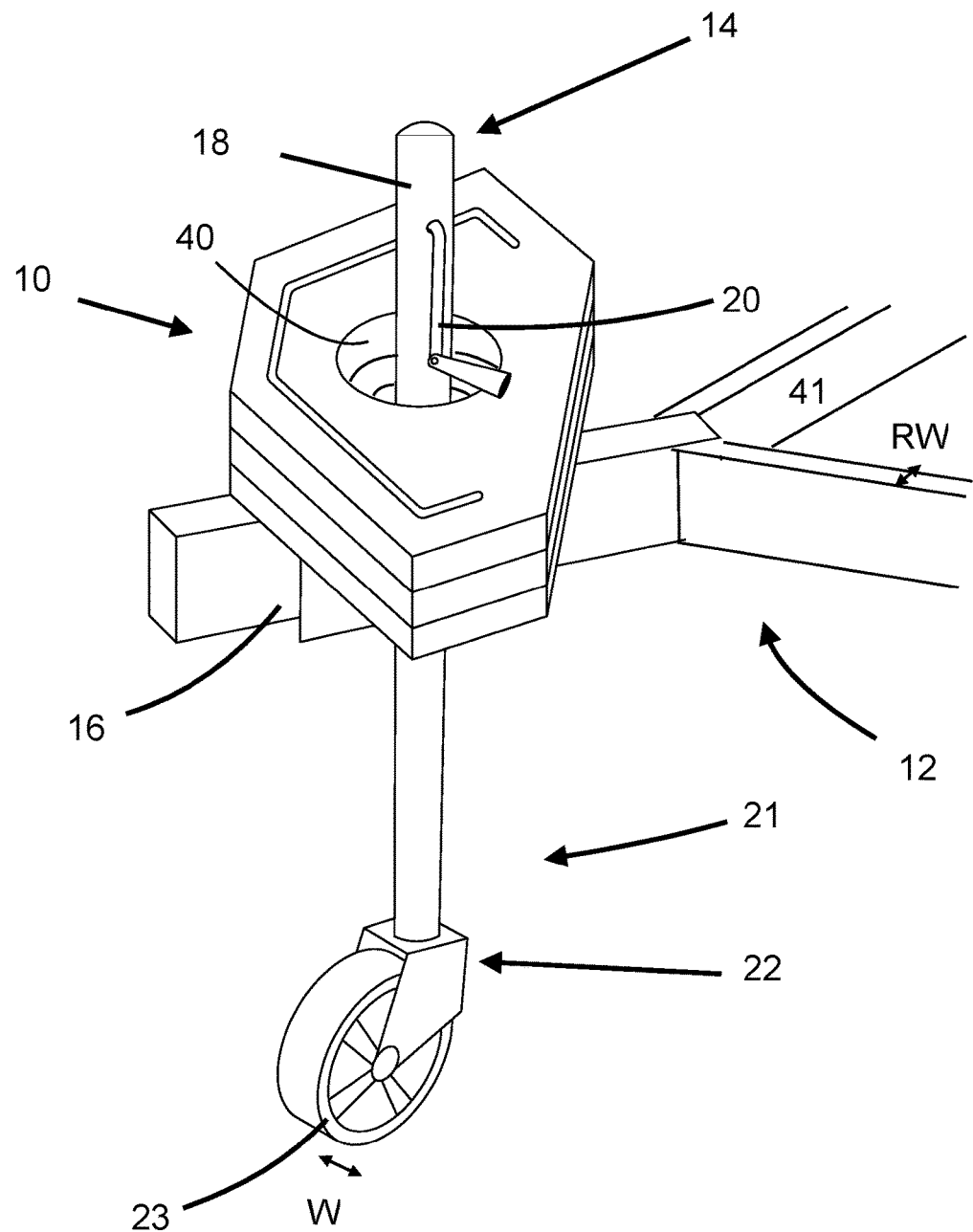
FIG. 5 is a perspective view of the invention in a stored mode.
Figure 6:
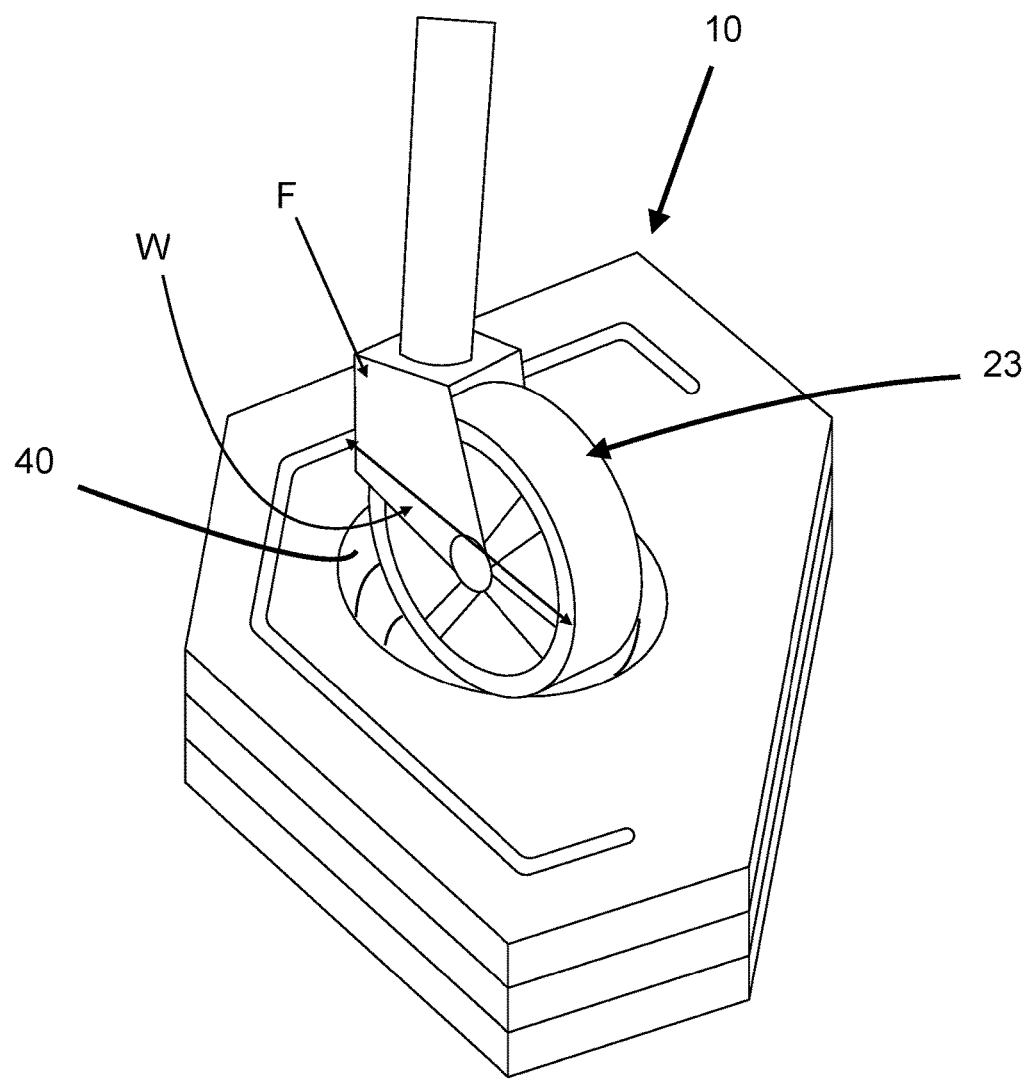
FIG. 6 is a perspective view of the invention in use in supporting a trailer.

It should be understood that the drawings are not necessarily to scale and that the embodiments are illustrative views. It should be understood, of course, that the invention is not necessarily limited to the particular embodiments illustrated herein.

DETAILED DESCRIPTION OF PREFERRED EMBODIMENTS

Referring now to the drawings, a jack block and stop of the instant invention is generally designated by the numerals 10 and 10'. The jack block and stop 10 is preferably for use with a trailer 12 of the type having an integral jack 14 at a forefront 16 of the trailer 12. The jack 14 has an upper stem 18 and crank handle 20 extending above the trailer 12 and a lower end 21 having an axially extendable foot 22 below the trailer 12.

The jack block and stop 10 includes an internal relatively lightweight support structure 30, a bottom surface 32 having a relatively flat aspect 34 to provide stable support when weight is applied on the jack block and stop 10, an upper surface 36 having relatively flat aspect 38, and a central open surface 40 entirely extending therethrough from the upper surface 36 to the bottom surface 32 which is large enough to receive the crank handle 20 therethrough and at least part of the upper stem 18 to retain the jack block and stop 10 thereabout in a stored mode. For example, the central open surface 40 can be less than about 3 inches in diameter. The central open surface 40 is preferably smaller than the foot 22 to prevent the same from passing entirely therethrough. Thus, in the case where the foot 22 includes a wheel 23, the central open surface 40 can receive part of the wheel 23 therein which serves to fix its position against movement. The jack block and stop 10 can also include rubberized coating 42 encasing surfaces thereof and provide an anti-slip surface as well as an easy to clean surface.

Figure 7:
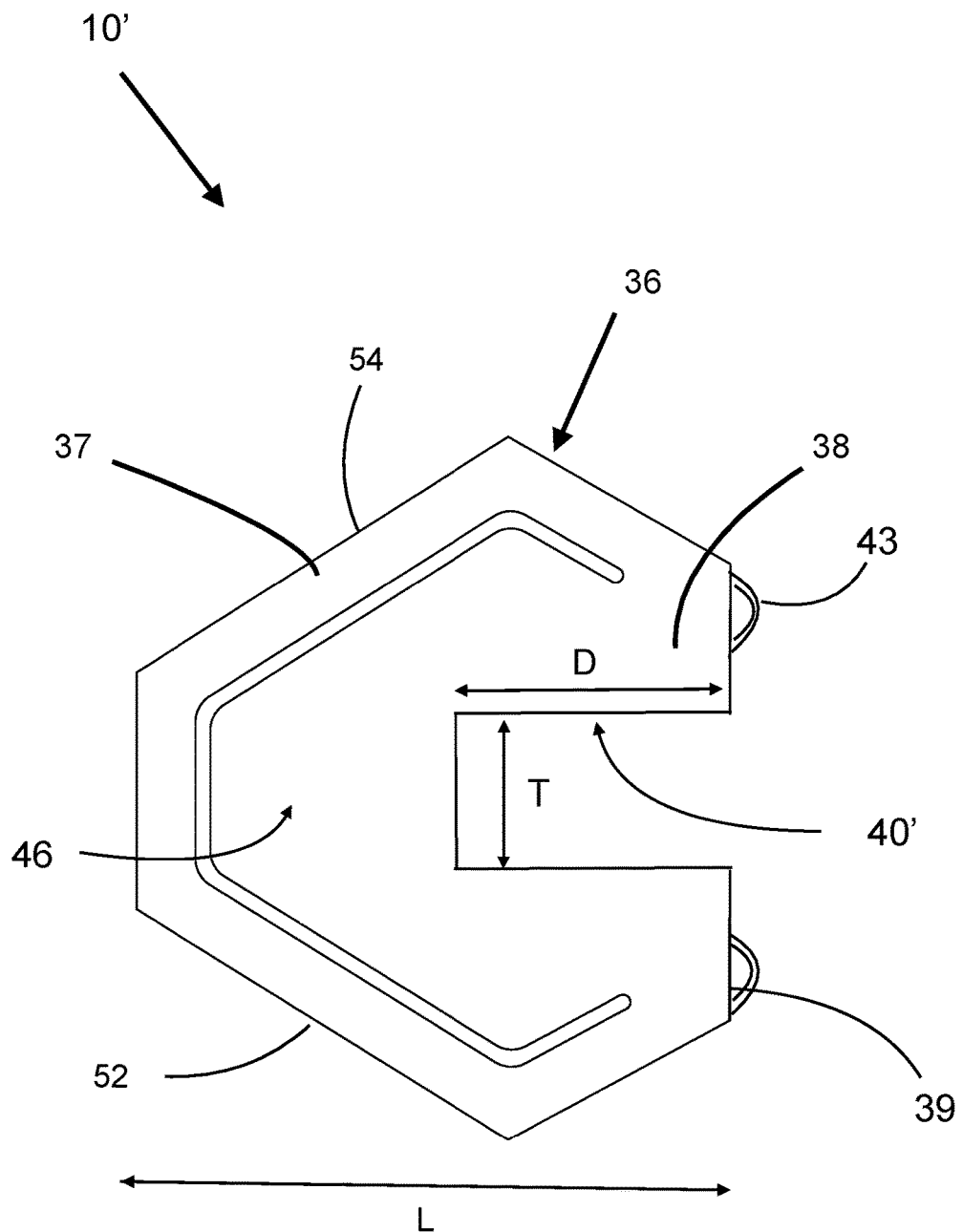
FIG. 7 is a top another embodiment of the invention.
Figure 8:
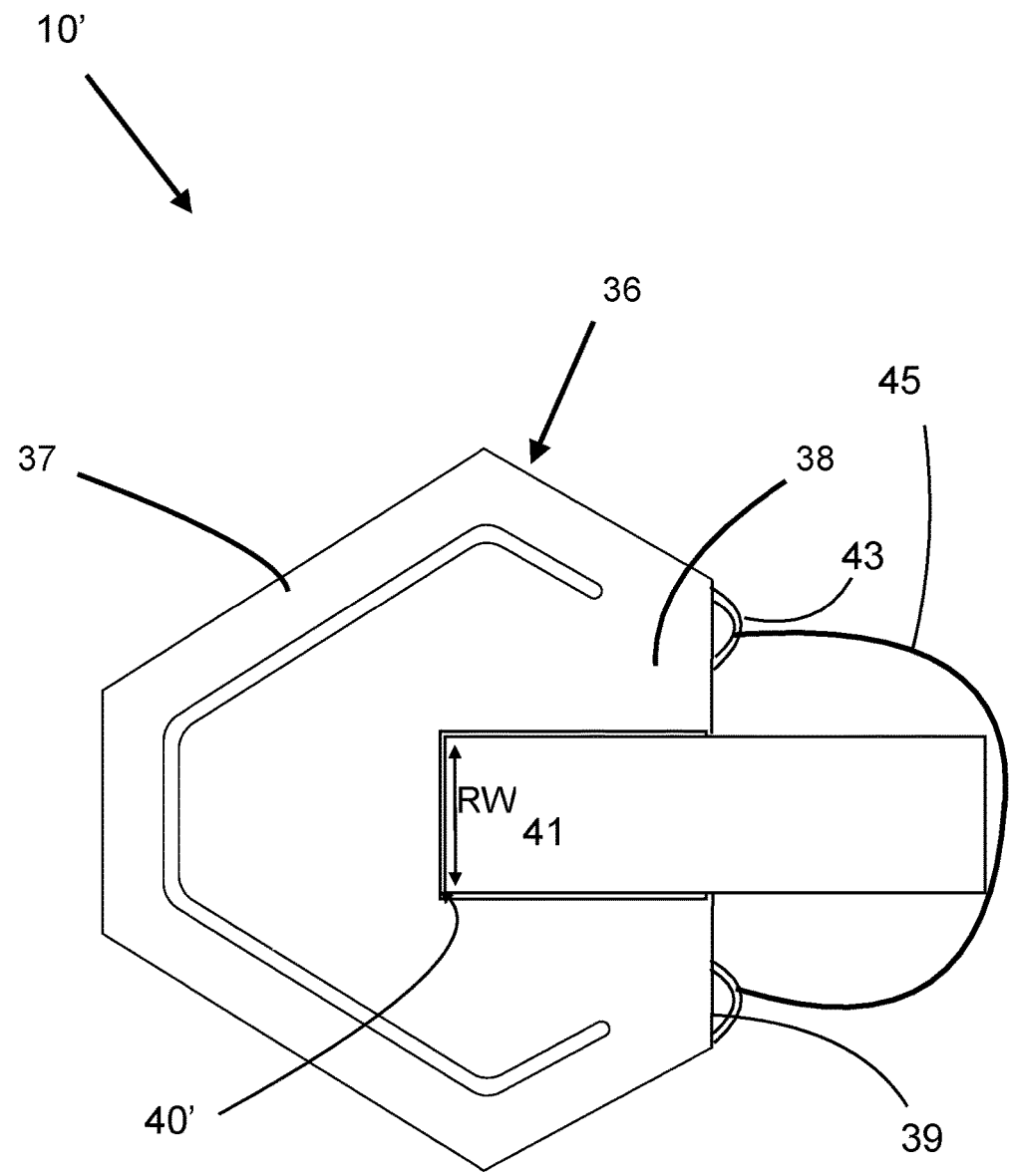
FIG. 8 is a top view of the embodiment in FIG. 7 showing a part of a trailer frame received therein.

In the embodiment shown in FIG. 7 and FIG. 8, jack block and stop 10' includes a modified central open surface 40' which extends from one side 39 inward a depth D and is configured to complementary receive rail 41 having a width RW. Thus, a slot 40' is created to alternatively receive a frame rail 41 on trailer 12 and maintain the jack block and stop 10' on the rail 41. In this case, connection surfaces 43 can be provided on the jack block and stop 10' surfaces 39 to enable a securing line 45, such as a bungee cord to be connected to secure the same to the trailer for transport. The central open surface 40' is smaller in at least one transverse direction T (width T) than the width W of foot F to prevent the same from passing entirely therethrough. Note in this embodiment, there is provided a greater landing area 46 on which a foot F can be disposed.

At least two sides 52 and 54 interconnect bottom surface 32 and the upper surface 36 which form an acute angle. The two sides 52 and 54 span more than half the length L of the lower surface 32 and upper surface 36.

The internal structure 30 can span between the upper surface 36 and bottom surface 32 from about 1 inch to 6 inches, for example. Larger spans can be achieved through a single core structure or laminate structure, for example, plywood laminate or plastic formed core, which is encased in the rubberized coating 42. It is envisioned that in the case where the internal structure span is smaller providing a thinner inner support structure 30, the upper surface 36 and bottom surface 32 can include a respective female and male complementary surface 37 and 33 aspects, respectively, to achieve stable way of stacking of like formed jack block and stops 10. It is recognized that the make female surfaces could be reversed. A suitable width for the jack block and stop 10 can preferably be from about 6 to 12 inches, for example. It is contemplated that jack block and stop 10 can be cylindrical or polygonal shape which can provide enhanced ease of storage about the stem 18 or rail 41.

The contents of all references cited in the instant specifications and all cited references in each of those references are incorporated in their entirety by reference herein as if those references were denoted in the text.

The inventors hereby state their intent to rely on the Doctrine of Equivalents to determine and assess the reasonably fair scope of the present invention as pertains to any apparatus not materially departing from but outside the literal scope of the invention as set forth in the following claims.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting.

It is to be understood that the terms used herein are merely descriptive rather than limiting and that various changes, numerous equivalents may be made without departing from the spirit or scope of the claimed invention.

What is claimed is:

1. A jack block and stop in combination with a trailer having an axially extendable foot having a width W below the trailer and further having a frame rail of a width RW, which includes:
   an internal support structure;
   a bottom surface having a length L and a relatively flat aspect to provide stable support when weight is applied on said jack block and stop;
   an upper surface having length L and a relatively flat aspect;
   at least two sides interconnecting said bottom surface and said upper surface which form an acute angle, said two sides spanning more than half said length L;
   a third side surface interconnecting said bottom surface and said upper surface; and
   a central opening entirely extending through from said upper surface and to said bottom surface and located on the third side surface and having a depth D and width T which is larger than width RW and less than width W and capable of receiving the frame rail and retaining said jack block and stop on the frame rail in a stored mode and for receiving the foot on said upper surface without passing through said central opening in a foot deployed mode.

2. The jack block and stop of claim 1, wherein said jack block includes rubberized coating encasing surface to provide anti-slip and ease in cleaning.

3. The jack block and stop of claim 1, said upper surface and said bottom surface include one of a complementary respective male and female surface aspect to provide stackability of a like formed jack block and stop.

4. The jack block and stop of claim 1, wherein said internal structure spans between said upper surface and said bottom surface.

5. The jack block and stop of claim 1, wherein said jack block and stop has a width larger than the foot of the trailer.

6. The jack block and stop of claim 1, wherein said third side surface has connection surfaces on either side of said central opening.

* * * * *